United States Patent
Lee et al.

(10) Patent No.: US 12,247,655 B2
(45) Date of Patent: Mar. 11, 2025

(54) WORKING FLUID STABILIZATION DEVICE FOR AGRICULTURAL WORK VEHICLE

(71) Applicant: LS MTRON LTD., Anyang-si (KR)

(72) Inventors: Soo Yeun Lee, Anyang-si (KR); Jung Min Kim, Suwon-si (KR); Ki Ho Yi, Gunpo-si (KR); Eun Hong Kim, Seongnam-si (KR); Ji Soo Lee, Hwaseong-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/578,996

(22) PCT Filed: Jul. 18, 2022

(86) PCT No.: PCT/KR2022/010429
§ 371 (c)(1),
(2) Date: Jan. 12, 2024

(87) PCT Pub. No.: WO2023/003294
PCT Pub. Date: Jan. 26, 2023

(65) Prior Publication Data
US 2024/0318715 A1    Sep. 26, 2024

(30) Foreign Application Priority Data

Jul. 21, 2021  (KR) .................. 10-2021-0095463
Jul. 12, 2022  (KR) .................. 10-2022-0085678

(51) Int. Cl.
*F16H 57/04*    (2010.01)
*F15B 21/00*    (2006.01)
*F16H 57/038*   (2012.01)

(52) U.S. Cl.
CPC ....... *F16H 57/0423* (2013.01); *F15B 21/008* (2013.01); *F16H 57/0495* (2013.01); *F16H 57/038* (2013.01)

(58) Field of Classification Search
CPC .......................... F16H 57/0423; F16H 57/038
See application file for complete search history.

(56) References Cited

U.S. PATENT DOCUMENTS

| | | | |
|---|---|---|---|
| 6,467,578 B1 * | 10/2002 | Winfree | F16H 57/0456 184/6.12 |
| 2007/0107951 A1 | 5/2007 | Abend et al. | |
| 2019/0285163 A1 * | 9/2019 | Cousins | F16H 57/0404 |

FOREIGN PATENT DOCUMENTS

| | | |
|---|---|---|
| JP | H07172195 A | 7/1995 |
| JP | 2002295636 A | 10/2002 |

(Continued)

OTHER PUBLICATIONS

International Search Report for related International Application No. PCT/KR2022/010429; action dated Jan. 26, 2023; (3 pages).

(Continued)

*Primary Examiner* — Jake Cook
(74) *Attorney, Agent, or Firm* — K&L Gates LLP

(57) ABSTRACT

The present disclosure relates to a working fluid stabilization device for an agricultural work vehicle, the working fluid stabilization device including: a case configured such that a working fluid is accommodated therein; a gear part disposed inside the case; a suction part formed in the bottom of the case, and connected to a suction pipe; and a baffle means disposed inside the case, and configured to alleviate the introduction of bubbles in the working fluid, generated by the rotation of the gear part, into the suction part. According to the present invention, there is an effect of preventing or alleviating the introduction of bubbles into the suction part of a transmission device.

7 Claims, 9 Drawing Sheets

(56) References Cited

FOREIGN PATENT DOCUMENTS

| JP | 2002295637 A | 10/2002 |
| JP | 2002295638 A | 10/2002 |
| JP | 2002295639 A | 10/2002 |

OTHER PUBLICATIONS

Written Opinion for related International Application No. PCT/KR2022/010429; action dated Jan. 26, 2023; (4 pages).

* cited by examiner

< Graph Comparing Generated Bubbles Depending on Application of Baffles >

| | | Baffles not applied | Baffles applied | Bubble generation rate after improvement | Reduction rate |
|---|---|---|---|---|---|
| Quantity of bubbles generated | 150mm²< | 47 | 11 | 24% | 76% reduction |
| | 200mm²< | 33 | 6 | 18% | 82% reduction |
| | 300mm²< | 11 | 1 | 9% | 91% reduction |
| Total area(㎟) | | 16,033 | 7,053 | 44% | 56% reduction |

< Bubble Reduction Rate Depending on Application of Baffles >

< Bubble Generation Box Graph Depending on Application of Baffles >

WORKING FLUID STABILIZATION DEVICE FOR AGRICULTURAL WORK VEHICLE

CROSS-REFERENCE TO RELATED APPLICATION

This application is a National Stage of International Application No. PCT/KR2022/010429 filed on Jul. 18, 2022, which claims priority to and the benefit of Korean Patent Application No. 10-2021-0095463, filed on Jul. 21, 2021, and Korean Patent Application No. 10-2022-0085678, filed Jul. 12, 2022, the disclosures of which are incorporated herein by reference in its entirety.

FIELD

The present disclosure relates to a working fluid stabilization device for an agricultural work vehicle, and more specifically, to a working fluid stabilization device for an agricultural work vehicle that can prevent or alleviate the introduction of bubbles into the suction part of a transmission device.

BACKGROUND

Agricultural work vehicles are used to grow crops required for human life by using land. For example, combines, tractors, etc. correspond to agricultural work vehicles. Combines are used to cut and thresh crops such as rice, barley, wheat, soybeans, etc. Tractors perform the work required to grow crops by using traction force.

These agricultural work vehicles include a transmission unit to adjust torque, speed, etc. during a work process as needed.

In general, agricultural work vehicles are driven using the power generated from an engine, and generate hydraulic pressure using the power generated from the engine and use the hydraulic pressure to control a steering unit and a work machine.

Mainly, the transmission oil inside the transmission unit is supplied as a working fluid via a hydraulic pump that is connected to the engine. The working fluid pressed by the hydraulic pump is supplied to the steering unit through a flow path to provide the power necessary to perform steering. Alternatively, the working fluid is supplied to a three-point link to which the work machine is connected to provide the power necessary to operate the work machine.

As described above, various valves may be configured in the flow path through which the working fluid is supplied. The steering unit and the work machine can be controlled through the control of these valves.

In this case, the working fluid flowing inside the flow path may contain some air. When the transmission oil inside the transmission unit is used as the working fluid, gears rotate inside the transmission unit, air is introduced into the transmission oil, and bubbles are generated. Alternatively, due to the movement of a tractor, the transmission unit may be shaken, and bubbles may be generated inside the transmission oil. These air bubbles may be mixed with the working fluid and supplied together with the working fluid during the process in which the hydraulic pump supplies the transmission oil as the working fluid.

FIG. 1 is a view showing a state in which bubbles are generated inside the transmission unit of an agricultural work vehicle according to the prior art. Referring to FIG. 1, there is shown the schematic internal structure of a transmission unit 20. A first gear 23 and a second gear 24 are meshed with each other inside a rear axle case 22, and the second gear 24 receives rotating force from the first gear 23 and rotates.

In this case, bubbles F may be generated in a working fluid M due to the rotation of various gears disposed inside the rear axle case 22, the movement of the tractor, or the like. There is a problem in that the generated bubbles F are introduced into a suction pipe 51 and moved to a hydraulic pump through the suction pipe 51.

As described above, when the working fluid contains bubbles, there is a problem in that noise and vibration are generated in the steering unit as the working fluid flows.

In addition, there is a problem in that durability is reduced as vibration is generated in the flow path, the hydraulic pump, the valves, the steering unit, and the three-point link.

In order to overcome the above problems, various efforts are being made to remove the bubbles contained in the working fluid flowing inside the flow path.

SUMMARY

The present disclosure has been conceived to overcome the above-described problems of the related art, and an object of the present disclosure is to provide a working fluid stabilization device for an agricultural work vehicle that can prevent or alleviate the introduction of bubbles into the suction part of a transmission device.

The present disclosure intended to achieve the above-described object is directed to a working fluid stabilization device for an agricultural work vehicle, the working fluid stabilization device including: a case configured such that a working fluid is accommodated therein; a gear part disposed inside the case; a suction part formed in the bottom of the case, and connected to a suction pipe; and a baffle means disposed inside the case, and configured to alleviate the introduction of bubbles in the working fluid, generated by the rotation of the gear part, into the suction part.

Furthermore, in an embodiment of the present disclosure, the baffle means may be disposed between the gear part and the suction part inside the case.

Furthermore, in an embodiment of the present disclosure, the baffle means may be coupled and fixed to the inner wall of a side of the case.

Furthermore, in an embodiment of the present disclosure, the baffle means may include: a first baffle disposed to be spaced apart from the inner wall of the side of the case; and a second baffle connected to the first baffle, and disposed between the gear part and the suction part.

Furthermore, in an embodiment of the present disclosure, the baffle means may further include a fastening portion formed in the first baffle, coupled to a support beam formed on the inner wall of the side of the case, and configured to fix the first baffle to the case.

Furthermore, in an embodiment of the present disclosure, the baffle means may further include a cutout portion formed in the first baffle, and cut out to correspond to the outer circumferential shape of the gear shaft flange of the gear part; and the first baffle may be mounted on the gear shaft flange.

Furthermore, in an embodiment of the present disclosure, the second baffle may be formed in a flat plate shape, and may be disposed to be inclined downward in the direction from one side, connected to the first baffle, to the opposite side.

Furthermore, in an embodiment of the present disclosure, the gear part may include: a first bevel gear connected to external power; and a second bevel gear perpendicularly meshed with the first bevel gear; and the first baffle may have a flat plate shape, and the second baffle may be formed in a curved plate shape disposed to surround the bottom of the second bevel gear.

Moreover, in an embodiment of the present disclosure, the second baffle may be disposed between the bottom of the second bevel gear and the top of the suction part.

According to the present disclosure, it may be possible to prevent or alleviate the introduction of bubbles into the suction pipe that is connected to the lower part of a rear axle case or center case constituting the transmission unit.

When bubbles are introduced, vibration and the abnormal operation of hydraulic parts may be caused, resulting in noise and abnormal operation. This may ultimately cause the erroneous operation of an agricultural work vehicle and the reduction in the durability of hydraulic parts.

The present disclosure has the technical effect of maintaining the performance of a hydraulic pump and the stable operation of an agricultural work vehicle by preventing bubbles, which may cause the above problems, from being introduced into the suction pipe, thereby stably maintaining the flow of the working fluid.

DETAILED DESCRIPTION

Figure 1:
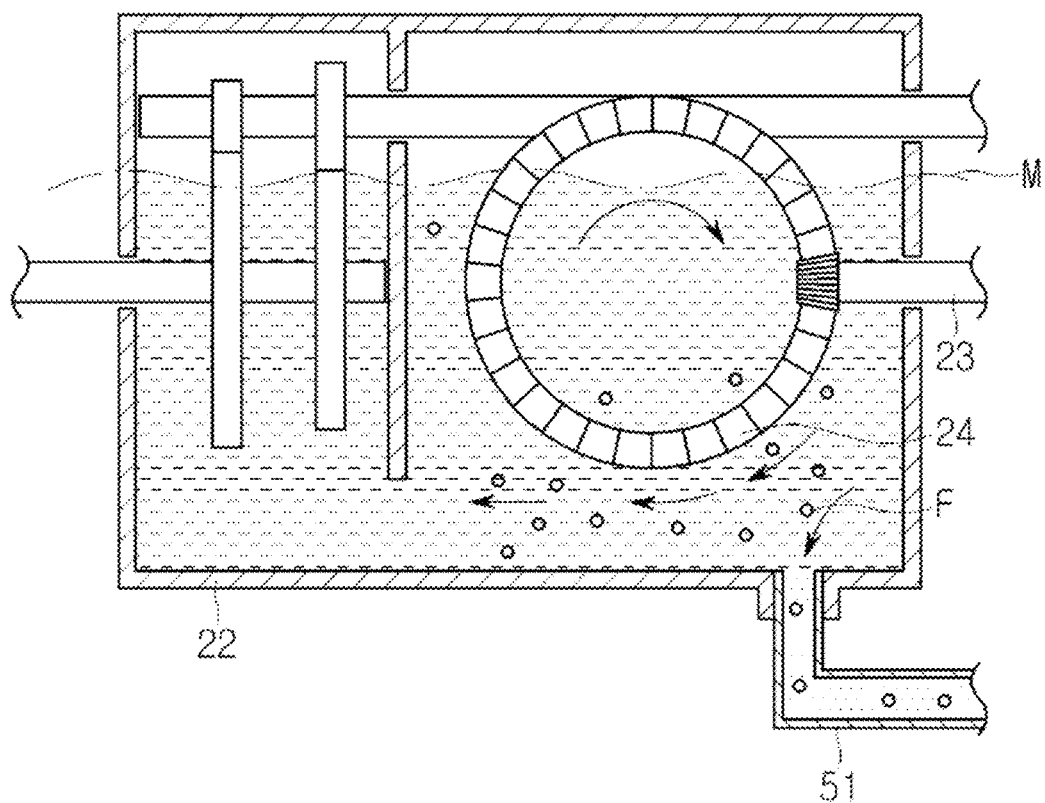
FIG. 1 is a view showing a state in which bubbles are generated inside the transmission unit of a conventional agricultural work vehicle.

The advantages and features of the present disclosure and methods for achieving them will become apparent by referring to the embodiments described in detail below along with the accompanying drawings. However, the present disclosure is not limited to the embodiments disclosed below and will be implemented in various different forms. These embodiments are provided merely to ensure that the disclosure of the present disclosure is complete and to fully convey the scope of the disclosure to those of ordinary skill in the art to which the present disclosure pertains. The present disclosure is defined only by the scope of the claims.

The shapes, sizes, proportions, angles, numbers, etc. disclosed in the drawings intended to illustrate embodiments of the present disclosure are illustrative, and the present disclosure is not limited to the illustrations shown in the drawings. Like reference numerals denote like components throughout the specification. Furthermore, in the description of the present disclosure, when it is determined that a detailed description of a related known technology may unnecessarily obscure the gist of the present disclosure, the detailed description will be omitted. When 'include,' 'have,' 'contain,' etc. described in the present specification are used, one or more other components may be added unless 'only' is used. When a component is described in a singular form, it includes a plural form unless specifically stated otherwise.

When a component is interpreted, it is interpreted to include the margin of error thereof even when there is no separate explicit description.

In the case of a description of a positional relationship, for example, when the positional relationship of two parts is described as 'on ~,' 'over ~,' 'beneath ~', 'next to ~,' etc., one or more other parts may be placed between the two parts unless 'immediately' or 'directly' is used.

Although first, second, etc. are used to describe various components, these components are not limited by these terms. These terms are merely used to distinguish one component from one or more other components. Accordingly, a first component to be described below may also be a second component within the technical spirit of the present disclosure.

Like reference symbols denote like components throughout the specification.

The size and thickness of each component shown in the drawing are shown for ease of description, and the present disclosure is not necessarily limited to the size and thickness of the component shown in the drawing.

The individual features of various embodiments of the present disclosure may be partially or fully coupled or combined with each other, and may be operated and driven in conjunction with each other in various manners as can be fully understood by those skilled in the art. The individual embodiments may be implemented independently of each other, or may be implemented in conjunction with each other.

The embodiments according to the present disclosure will be described in detail below with reference to the accompanying drawings. A plurality of embodiments described below may be applied in an overlapping manner as long as they do not conflict with each other.

Figure 2:
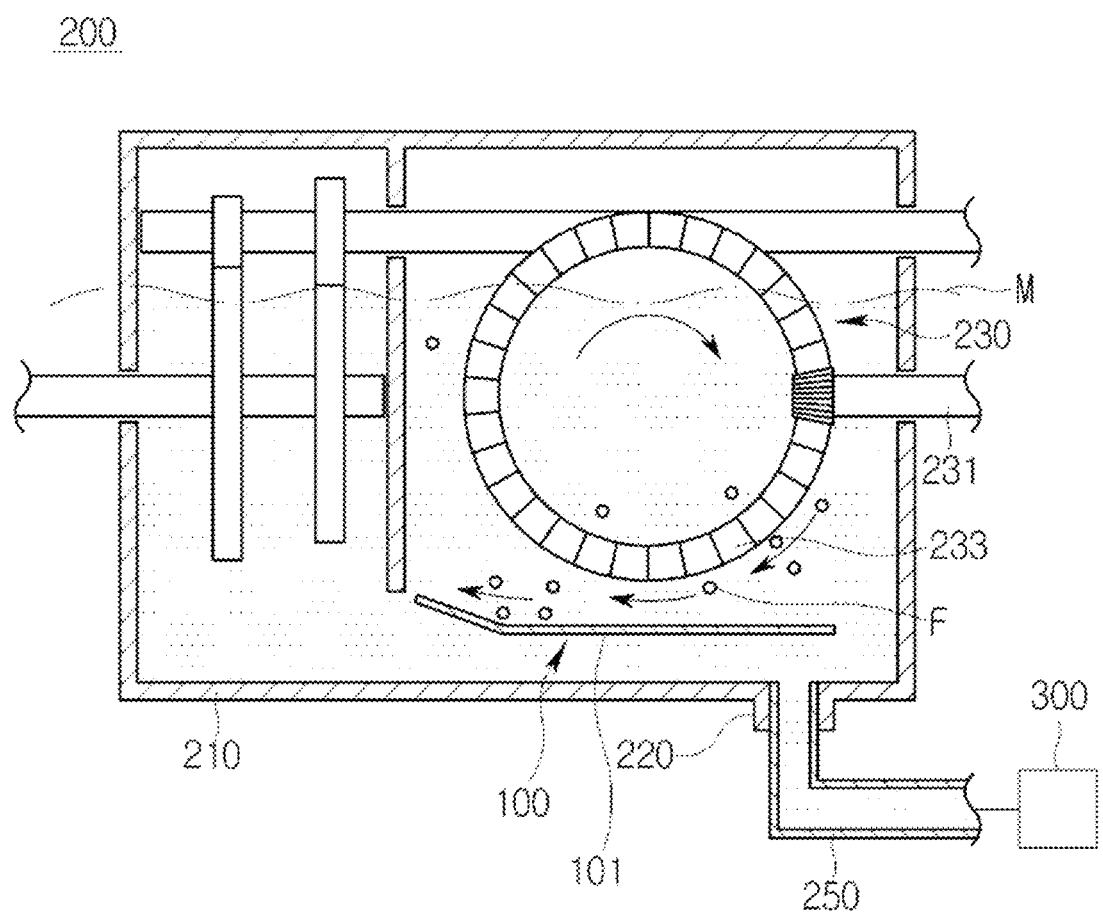
FIG. 2 shows a state in which the working fluid stabilization device of the present disclosure is mounted in the transmission unit of an agricultural work vehicle.

FIG. 2 shows a state in which the working fluid stabilization device 100 of the present disclosure is mounted in the transmission unit 200 of an agricultural work vehicle.

Referring to FIG. 2, the transmission unit 200 in which the working fluid stabilization device 100 of the present disclosure is mounted may include a case 210, a gear part 230, and a suction part 220.

The case 210 may form the appearance of the transmission unit 200 and may accommodate a working fluid. Furthermore, a predetermined space may be formed inside the case 210, and the gear part 230 may be disposed in the predetermined space. In this case, the working fluid may be transmission oil that is used in the transmission unit 200 of the agricultural work vehicle.

The suction part 220 may be disposed on the lower portion of the case 210, and a working fluid may be introduced into a suction pipe 250 through the suction part 220 and supplied to a hydraulic pump 300. In this case, the lower portion of the case 210 may refer to the bottom surface of the case 210 that is located downward along the direction of gravity.

The gear part 230 may include a first bevel gear 231 and a second bevel gear 233. The first bevel gear 231 may be connected to external power. The second bevel gear 233 may be disposed inside the case 210, and may be meshed with, receive power from, and be rotated together with the first bevel gear 231.

In an embodiment of the present disclosure, the working fluid stabilization device 100 may be a baffle means 101 that is disposed inside the case 210 and alleviates the introduction of bubbles in the working fluid, generated by the rotation of the gear part 230, into the suction part 220.

The baffle means 101 may be disposed between the gear part 230 and the suction part 220 inside the case 210. Furthermore, the baffle means 101 may be coupled and fixed to the inner wall of a side of the case 210. In this case, the side of the case 210 may refer to a side surface of the case 210 located on a side perpendicular to the direction of gravity.

As shown in FIG. 2, when the first bevel gear 231 transmits rotational force, the second bevel gear rotates inside the case 210. In this case, the second bevel gear 233 is immersed in the working fluid M, so that, as the second bevel gear 233 rotates, it generates vortexes in the working fluid M and thus generates bubbles F in the working fluid M in the direction of rotation as indicated by the arrows.

The baffle means 101 is disposed between the second bevel gear 233 of the gear part 230 and the suction part 220 and functions as a partition. Accordingly, the introduction of bubbles F in the working fluid M, generated due to vortexes during the rotation of the second bevel gear 233, into the suction part 220 may be blocked or alleviated.

Figure 3:
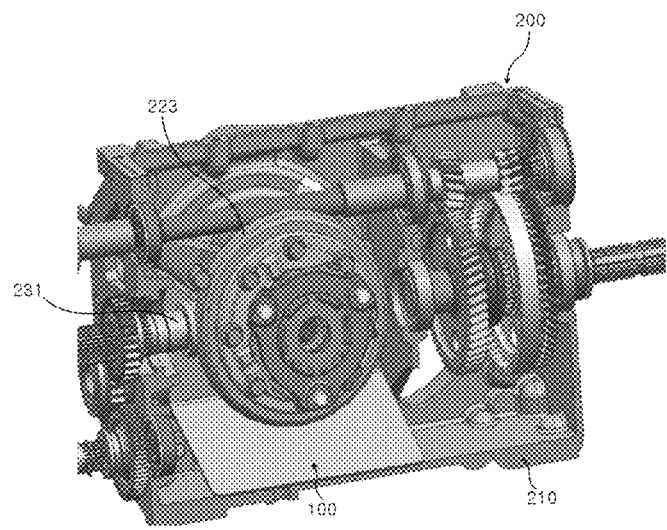
FIG. 3 shows a first embodiment of the baffle means of the present disclosure that is mounted in the transmission unit of the agricultural work vehicle.
Figure 4A:
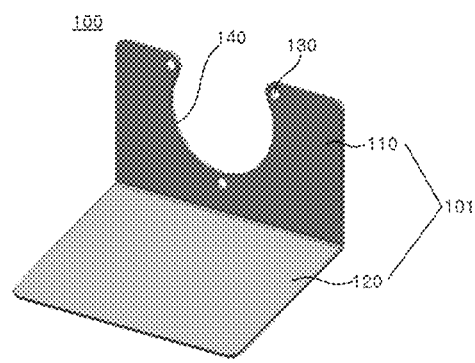
FIG. 4A is a view showing the first embodiment of the baffle means of the present disclosure shown in FIG. 3.
Figure 4B:
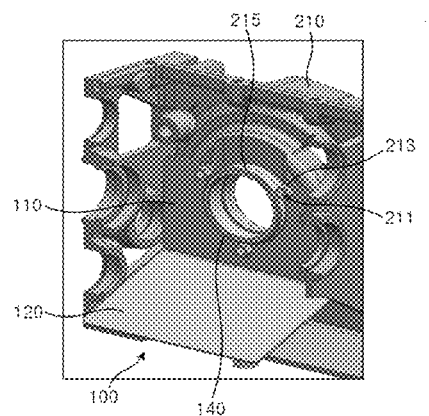
FIG. 4B is a perspective view showing a state in which the first embodiment of the baffle means of the present disclosure is fixed to the support beams of the transmission unit with fastening bolts.
Figure 5:
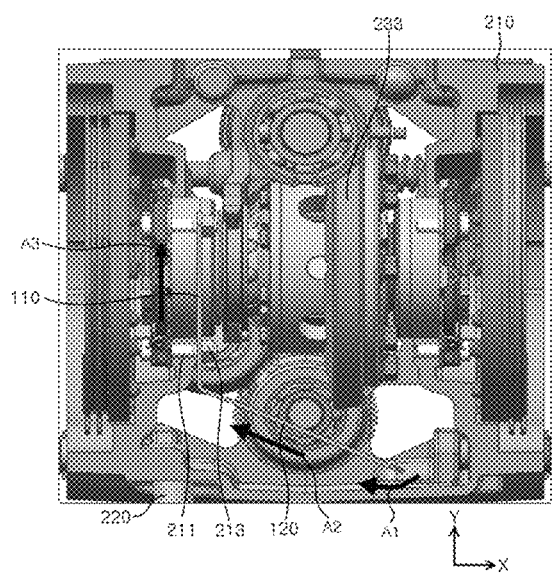
FIG. 5 is a side view showing a state in which the first embodiment of the baffle means of the present disclosure is fixed to the support beams of the transmission unit with fastening bolts.

Meanwhile, FIGS. 3 to 5 show a first embodiment of the baffle means 101 of the present disclosure that is mounted in the transmission unit 200 of an agricultural work vehicle.

Referring to FIGS. 3 to 5, the baffle means 101 according to the first embodiment of the present disclosure may include a first baffle 110, a second baffle 120, a plurality of fastening portions 130, and a cutout portion 140.

The first baffle 110 may be disposed to be spaced apart from the inner wall of a side of the case 210. That is, a space may be formed between the first baffle 110 and the inner wall of the side of the case 210.

More specifically, the first baffle 110 may be mounted on a gear flange that is formed in the case 210. A cylindrical gear shaft flange 215 through which the shaft of the second bevel gear 233 passes may be formed in the case 210, and the first baffle 110 may be disposed to surround the outer circumference of the gear shaft flange 215.

In this case, the cutout portion 140 may be formed in the first baffle 110 and have a shape corresponding to the outer circumferential shape of the gear shaft flange 215. The first baffle 110 may be fixed to the outer circumference of the gear shaft flange 215 while the cutout portion 140 may be inserted over the gear shaft flange 215.

In addition, the plurality of fastening portions 130 may be disposed adjacent to the cutout portion 140 in the first baffle 110. Referring to FIG. 5, a plurality of support beams 211 may be formed on the inner wall of the side of the case 210, and the plurality of support beams 211 may be coupled into the plurality of fastening portions 130, respectively. For example, a thread may be formed at the end of each of the support beams 211, and the support beam 211 may be fastened with a fastening bolt 213 after being inserted into the fastening portion 130. This fastening structure is not limited to a specific one and may vary. Through this configuration of the support beams 211, the baffle means 101 may be disposed and fixed to be spaced apart from the inner wall of the side of the case 210.

The second baffle 120 may be connected to the first baffle 110 and disposed between the gear part 230 and the suction part 220.

In the first embodiment of the present disclosure, the first baffle 110 and the second baffle 120 may each have a flat plate shape. Furthermore, the first baffle 110 may be disposed vertically inside the case 210. Referring to FIG. 5, the first baffle 110 may be fixed to the plurality of support beams 211 and disposed in a direction vertical to the rotation shaft of the second bevel gear 233.

Furthermore, the second baffle 120 may be disposed to be inclined at a predetermined angle with respect to the first baffle 110. More specifically, the second baffle 120 may be formed in a flat plate shape, and may be disposed to be inclined downward in a direction from one side, connected to the first baffle 110, to the opposite side. In this case, the suction part 220 is disposed under the second baffle 120.

According to this structure, the second bevel gear 233 rotates, and vortexes are generated in the working fluid. Accordingly, even when bubbles are generated due to this phenomenon, the bubbles are basically blocked by the first and second baffles and are not introduced into the suction part 220.

Even when bubbles flow in the direction of the suction part 220 through the lower part of the second baffle 120 as indicated by arrow A1, the bubbles move in the direction of arrow A2 along the inclined surface of the second baffle 120. Thereafter, the bubbles move upward as indicated by arrow A3 along the space between the first baffle 110 and the case 210. The quantity of bubbles introduced into the suction part 220 may be significantly reduced. That is, even when some bubbles are introduced under the working fluid stabilization device 100 of the present disclosure, the bubbles may be guided upward through the slope of the second baffle 120, and may be discharged above the working fluid stabilization device 100 through the space between the first baffle 110 and the case 210.

Figure 6:
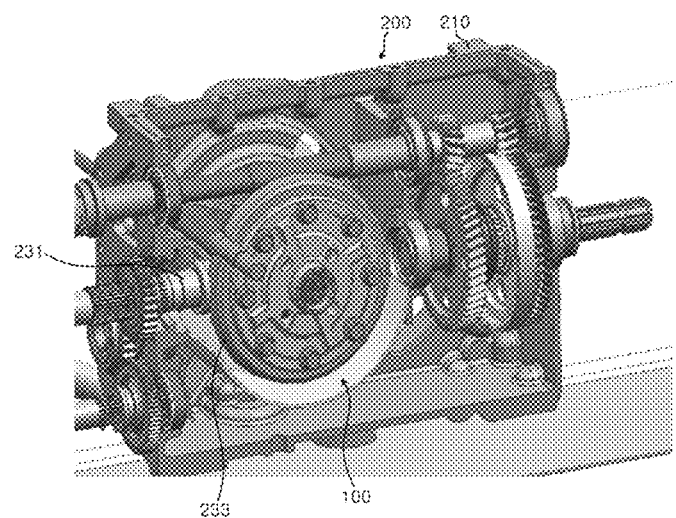
FIG. 6 is a view showing a second embodiment of the baffle means of the present disclosure that is mounted in the transmission unit of an agricultural work vehicle.
Figure 7A:
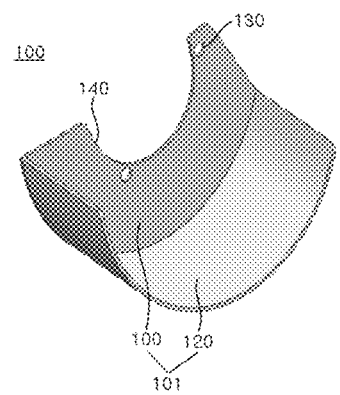
FIG. 7A is a view showing the second embodiment of the baffle means of the present disclosure shown in FIG. 6.
Figure 7B:
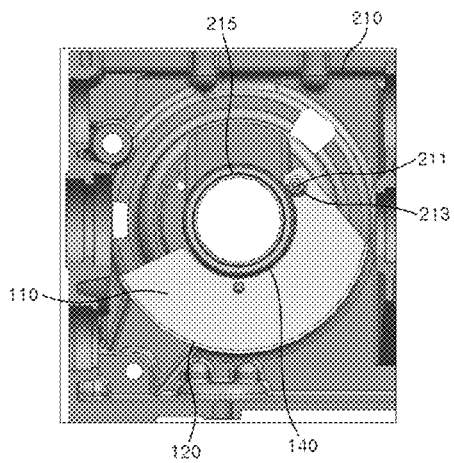
FIG. 7B is a view showing a state in which the second embodiment of the baffle means of the present disclosure is fixed to the support beams of the transmission unit with fastening bolts.

Meanwhile, referring to FIGS. 6 to 7b, there is shown a second embodiment of the baffle means 101 of the present disclosure that is mounted in the transmission unit 200 of the agricultural work vehicle.

Referring to FIGS. 6 to 7b, the baffle means 101 according to the second embodiment of the present disclosure may include a first baffle 110, a second baffle 120, a plurality of fastening portions 130, and a cutout portion 140.

The first baffle 110 may be disposed to be spaced apart from the inner wall of a side of the case 210. That is, a space may be formed between the first baffle 110 and the inner wall of the side of the case 210.

More specifically, the first baffle 110 may be mounted on a gear flange that is formed in the case 210. A cylindrical gear shaft flange 215 through which the shaft of the second bevel gear 233 passes may be formed in the case 210, and the first baffle 110 may be disposed to surround the outer circumference of the gear shaft flange 215.

In this case, the cutout portion 140 may be formed in the first baffle 110 and have a shape corresponding to the outer circumferential shape of the gear shaft flange 215. The first baffle 110 may be fixed to the outer circumference of the gear shaft flange 215 while the cutout portion 140 is inserted over the gear shaft flange 215.

In addition, the plurality of fastening portions 130 may be disposed adjacent to the cutout portion 140 in the first baffle 110. Referring to FIG. 7B, a plurality of support beams 211 may be formed on the inner wall of the side of the case 210, and the plurality of support beams 211 may be coupled into the plurality of fastening portions 130, respectively. For example, a thread may be formed at the end of each of the support beams 211, and the support beam 211 may be fastened with a fastening bolt 213 after being inserted into the fastening portion 130. This fastening structure is not limited to a specific one and may vary. Through this configuration of the support beams 211, the baffle means 101 may be disposed and fixed to be spaced apart from the inner wall of the side of the case 210.

The second baffle 120 may be connected to the first baffle 110 and disposed between the gear part 230 and the suction part 220.

In the second embodiment of the present disclosure, the first baffle 110 may have a flat plate shape, and the second baffle 120 may have a curved plate shape disposed to surround the lower part of the second bevel gear 233.

In addition, the first baffle 110 may be disposed vertically inside the case 210. Referring to FIG. 7B, the first baffle 110 may be fixed to the plurality of support beams 211 and disposed in a direction vertical to the rotation shaft of the second bevel gear 233.

According to this structure, the second bevel gear 233 rotates, and vortexes are generated in the working fluid. Accordingly, even when bubbles are generated due to this phenomenon, the bubbles are basically blocked by the first and second baffles and are not introduced into the suction part 220.

In particular, the second baffle 120 is disposed to surround the lower part of the second bevel gear 233. Accordingly, as shown in FIG. 2, the bubbles generated under the second bevel gear 233 as the second bevel gear 233 rotates may be effectively blocked from being introduced into the suction part 220, or the quantity of bubbles introduced into the suction part 220 may be significantly reduced. That is, even when some bubbles are introduced into the lower part of the working fluid stabilization device 100 of the present disclosure, the bubbles may be guided upward through the slope of the second baffle 120, and the bubbles may be discharged above the working fluid stabilization device 100 through the space between the first baffle 110 and the case 210.

Figure 8:
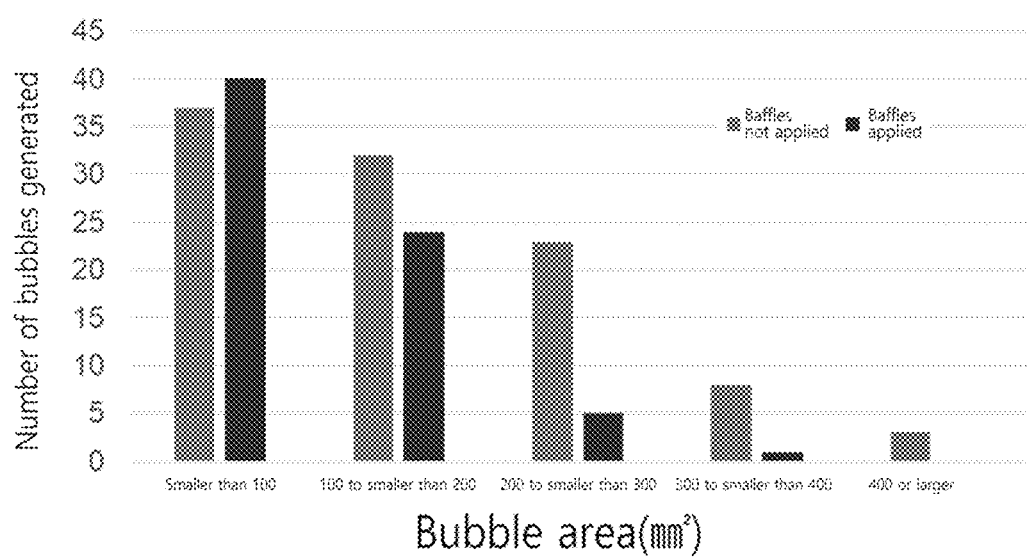
FIG. 8 is a graph comparing the numbers of bubbles generated versus bubble areas before and after the application of the baffles constituting the working fluid stabilization device of the present disclosure.

Meanwhile, FIG. 8 is a graph comparing the numbers of bubbles generated versus bubble areas before and after the application of the baffles constituting the working fluid stabilization device 100 of the present disclosure.

Referring to FIG. 8, it can be seen that, when a case where the baffle means 101 is installed is compared with a case where the baffle means 101 is not installed, the number of bubbles generated was generally reduced for bubble areas of 100 $mm^2$ or more.

In particular, it was found through experimental values that the quantity of bubbles was reduced by approximately 76% or more for bubble areas of 150 $mm^2$ or more.

Accordingly, the total bubble area was reduced by approximately 56% from the previous 16,033 $mm^2$ to 7,053 $mm^2$.

Figures 9, 10:
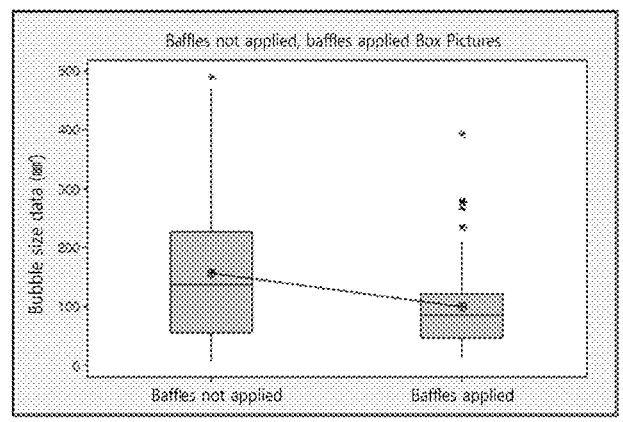
FIG. 9 is a graph comparing bubble reduction rates before and after the application of the baffles constituting the working fluid stabilization device of the present disclosure.
FIG. 10 is a graph showing bubble generation boxes before and after the application of the baffles constituting the working fluid stabilization device of the present disclosure.

FIG. 9 is a graph comparing bubble reduction rates before and after the application of the baffles constituting the working fluid stabilization device 100 of the present disclosure.

The following numerical values are numerical values related to the bubbles that were measured in the suction pipe 250 directed to the hydraulic pump 300 for approximately 8 seconds.

Referring to FIG. 9, numerically, a) for a bubble area of 150 $mm^2$ or larger, the number of bubbles generated was 47 in the case of the absence of the baffles and was reduced to 11 in the case of the presence of the baffles. In other words, the number of bubbles generated was reduced by approximately 76%, and accordingly, the bubble generation rate after the improvement was improved to approximately 24%.

Furthermore, b) for a bubble area of 200 $mm^2$ or larger, the number of bubbles generated was 33 in the case of the absence of the baffles and was reduced to 6 in the case of the presence of the baffles. In other words, the number of bubbles generated was reduced by approximately 82%, and accordingly, the bubble generation rate after the improvement was improved to approximately 18%.

Furthermore, c) for a bubble area of 300 $mm^2$ or larger, the number of bubbles generated was 11 in the case of the absence of the baffles and was reduced to 1 in the case of the presence of the baffles. In other words, the number of bubbles generated was reduced by approximately 91%, and accordingly, the bubble generation rate after the improvement was improved to approximately 9%.

The total area ($mm^2$) was calculated as the number of bubbles generated×the bubble area ($mm^2$). There was a total decrease of approximately 56% from 16,033 $mm^2$ before the application of the baffles to 7,053 $m^2$ after the application of the baffles. Accordingly, the bubble generation rate after the improvement was improved to approximately 44%. In other words, the bubble generation area was decreased by approximately half by mounting the working fluid stabilization means. This indicates that the quantity of bubbles introduced into the suction pipe 250 was significantly reduced.

FIG. 10 is a graph showing bubble generation boxes before and after the application of the baffles constituting the working fluid stabilization device 100 of the present disclosure.

Referring to FIG. 10, it can be seen that the bubble size ($mm^2$) data was relatively widely distributed in the case of the absence of the baffles whereas the bubble size ($mm^2$) data was relatively narrowly distributed in the case of the presence of the baffles. In particular, when the baffles were applied, the bubble sizes were distributed in a smaller range.

In other words, it can be seen that, when the baffles were applied, bubbles having relatively large sizes were blocked by the baffles, so that the quantity of the bubbles introduced into the suction pipe 250 was significantly reduced.

The vibration, noise, etc. and the decrease in the durability of hydraulic components caused by bubbles are mainly caused by large-sized bubbles, so that the reduction in the introduction of bubbles having large bubble areas alleviates the problems of the prior art.

Figure 11:
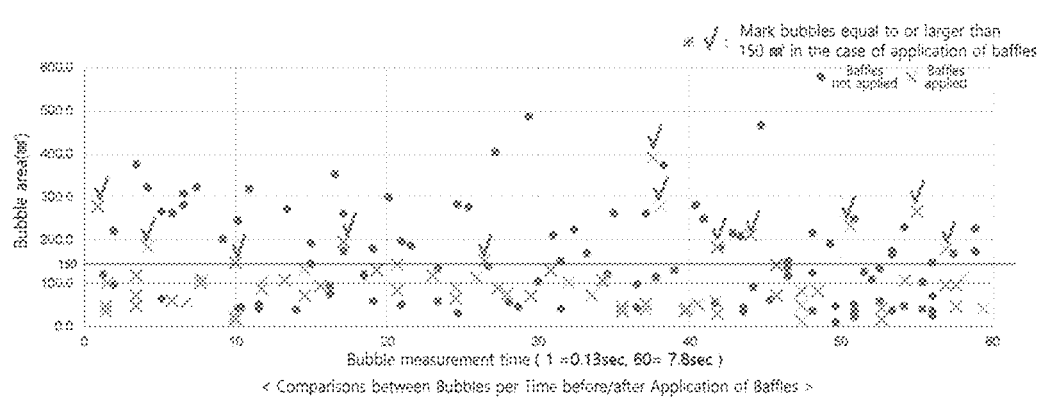
FIG. 11 is a graph comparing bubble areas versus bubble measurement times before and after the application of the baffles constituting the working fluid stabilization device of the present disclosure.

FIG. 11 is a graph comparing bubble areas versus bubble measurement times before and after the application of the baffles constituting the working fluid stabilization device 100 of the present disclosure.

Referring to FIG. 11, the bubble measurement time was approximately 8 seconds, more exactly 7.8 seconds. The horizontal numerical section 1 was 0.13 sec, and accordingly, the measurement section 60 was 7.8 sec.

It can be seen that before the application of the baffles, bubbles having large bubble areas were frequently generated during the measurement time whereas, after the application of the baffles, the frequency of generation of bubbles having relatively large bubble areas decreased during the measurement time.

It can be seen that through this, when the working fluid stabilization device 100 was applied, the introduction of bubbles having large bubble areas into the suction pipe 250 might be reduced.

Figure 12A:
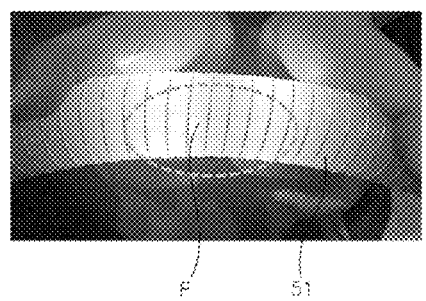
FIG. 12A is a diagram showing the state of bubbles in a conventional suction pipe.
Figure 12B:
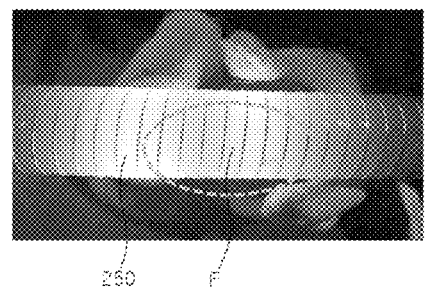
FIG. 12B is a diagram showing the state of bubbles in the suction pipe after the working fluid stabilization device of the present disclosure has been installed.

FIG. 12A is a diagram showing the state of bubbles in a conventional suction pipe 250, and FIG. 12B is a diagram showing the state of bubbles in the suction pipe 250 after the working fluid stabilization device 100 of the present disclosure has been installed.

FIGS. 8 to 11 compare the states of generation of bubbles before and after the application of the baffles, and FIGS. 12a and 12b show actual bubble sizes.

As shown in FIG. 12A, before the application of the baffles, it can be seen with the naked eye that bubbles having large bubble areas were introduced into the suction pipe 250. In contrast with this, in FIG. 12B, it can be seen that after the application of the baffles, bubbles having relatively small bubble areas were identified inside the suction pipe 250.

As described above, after the application of the working fluid stabilization device 100, the total area of bubbles introduced into the suction pipe 250 could be reduced, and in particular, the introduction of bubbles having large bubble areas could be reduced.

This may achieve the effect of reducing noise and vibration caused by bubbles in the working fluid. Furthermore, the stable flow of the working fluid may be maintained, so that problems such as undesirable maintenance in the performance of the hydraulic pump, the erroneous operation of the agricultural work vehicle, and the reduction in the durability of the hydraulic parts can be prevented. Ultimately, the stable operation of the agricultural work vehicle may be maintained.

The above description merely shows specific embodiments of the working fluid stabilization device for an agricultural work vehicle.

Therefore, it should be noted that it will be apparent to those of ordinary skill in the art that the present disclosure may be substituted and modified in various forms without departing from the spirit of the present disclosure set forth in the following claims.

The present disclosure has industrial applicability as a technology related to agricultural tractors.

The invention claimed is:

1. A working fluid stabilization device for an agricultural work vehicle, the working fluid stabilization device comprising:
a case configured such that a working fluid is accommodated therein;
a gear part disposed inside the case;
a suction part formed in a bottom of the case, and connected to a suction pipe; and
a baffle means disposed inside the case, and configured to alleviate introduction of bubbles in the working fluid, generated by rotation of the gear part, into the suction part, wherein the baffle means is coupled and fixed to an inner wall of a side of the case, wherein the baffle means includes:
a first baffle disposed to be spaced apart from the inner wall of the side of the case;
a second baffle connected to the first baffle, and disposed between the gear part and the suction part;
a cutout portion formed in the first baffle, and cut out to correspond to an outer circumferential shape of a gear shaft flange of the gear part; and
wherein the first baffle is mounted on the gear shaft flange.

2. The working fluid stabilization device of claim 1, wherein the baffle means is disposed between the gear part and the suction part inside the case.

3. The working fluid stabilization device of claim 1, wherein the baffle means further includes a fastening portion formed in the first baffle, coupled to a support beam formed on the inner wall of the side of the case, and configured to fix the first baffle to the case.

4. The working fluid stabilization device of claim 1, wherein the second baffle is formed in a flat plate shape, and is disposed to be inclined downward in a direction from one side, connected to the first baffle, to an opposite side.

5. The working fluid stabilization device of claim 1, wherein:
the gear part includes: a first bevel gear connected to external power; and a second bevel gear perpendicularly meshed with the first bevel gear; and
the first baffle has a flat plate shape, and the second baffle is formed in a curved plate shape disposed to surround a bottom of the second bevel gear.

6. The working fluid stabilization device of claim 5, wherein the second baffle is disposed between the bottom of the second bevel gear and a top of the suction part.

7. A working fluid stabilization device for an agricultural work vehicle, the working fluid stabilization device comprising:
a case configured such that a working fluid is accommodated therein;
a gear part disposed inside the case, wherein the gear part includes:
a first bevel gear connected to external power; and
a second bevel gear perpendicularly meshed with the first bevel gear;
a suction part formed in a bottom of the case, and connected to a suction pipe; and
a baffle means disposed inside the case, and configured to alleviate introduction of bubbles in the working fluid, generated by rotation of the gear part, into the suction part, wherein the baffle means is coupled and fixed to an inner wall of a side of the case, wherein the baffle means includes:
a first baffle disposed to be spaced apart from the inner wall of the side of the case, wherein the first baffle has a flat plate shape; and
a second baffle connected to the first baffle, and disposed between the gear part and the suction part, wherein the second baffle is formed in a curved plate shape disposed to surround a bottom of the second bevel gear.

\* \* \* \* \*